United States Patent
Carr (10) Patent No.: US 10,853,084 B2
(45) Date of Patent: Dec. 1, 2020

(54) SYSTEM AND METHOD FOR COORDINATING RESOURCES

(71) Applicant: ABB Schweiz AG, Baden (CH)

(72) Inventor: Joseph A. Carr, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 54 days.

(21) Appl. No.: 16/274,704

(22) Filed: Feb. 13, 2019

(65) Prior Publication Data

US 2020/0257537 A1    Aug. 13, 2020

(51) Int. Cl.
*G06F 9/38* (2018.01)
*H02J 3/14* (2006.01)
*G06F 9/48* (2006.01)
*G06F 9/50* (2006.01)

(52) U.S. Cl.
CPC .......... *G06F 9/3891* (2013.01); *G06F 9/4893* (2013.01); *G06F 9/5005* (2013.01); *H02J 3/14* (2013.01)

(58) Field of Classification Search
CPC ......... G06F 9/48; G06F 9/5005; G06F 9/3891
See application file for complete search history.

(56) References Cited

U.S. PATENT DOCUMENTS

| | | | |
|---|---|---|---|
| 8,819,239 B2 | 8/2014 | Wu et al. | |
| 9,590,423 B2 | 3/2017 | Yang et al. | |
| 9,600,790 B2 | 3/2017 | Mohagheghi et al. | |
| 2009/0024563 A1* | 1/2009 | Sengar | G06F 11/3452 |
| 2013/0119770 A1 | 5/2013 | Guo | |
| 2014/0059228 A1* | 2/2014 | Parikh | H04L 67/42 709/226 |
| 2015/0235156 A1* | 8/2015 | Dasari | G06F 9/5005 705/7.24 |
| 2017/0229870 A1 | 8/2017 | Singh et al. | |
| 2018/0060894 A1* | 3/2018 | Beveridge | G06F 9/50 |
| 2018/0088993 A1* | 3/2018 | Gerdesmeier | G06F 9/5005 |
| 2018/0157536 A1* | 6/2018 | Jiang | G06F 9/5005 |
| 2019/0155234 A1* | 5/2019 | Devi | G06F 9/5072 |

OTHER PUBLICATIONS

Ghassem Mokhtari, Arindam Ghosh, Ghavameddin Nourbakhsh, Gerard Ledwich, "Smart Robust Resources Control in LV Network to Deal with Voltage Rise Issue," IEEE Transactions on Sustainable Energy, vol. 4, issue 4, pp. 1043-1050, Oct. 1, 2013.

(Continued)

*Primary Examiner* — Tuan C Dao
(74) *Attorney, Agent, or Firm* — Taft Stettinius & Hollister LLP; J. Bruce Schelkopf (57) ABSTRACT

Coordination of a plurality of resources is disclosed to respond to a local service target. A local measurement is taken by a first resource and, if the first resource cannot satisfy the local service target, short range recruitment of one or more additional resources is performed by providing a first signal to a cluster of resources associated with the first resource. If the short range recruitment does not satisfy the local service target, a second signal is provided to a network resource controller for long range recruitment of one or more resources to satisfy the local service target.

23 Claims, 5 Drawing Sheets

(56) References Cited

OTHER PUBLICATIONS

Hossein Falahzadeh-Abarghouei, Majid Nayeripour, Eberhard Waffenschmidt, Saeed Hasanvand, "A New Decentralized Voltage Control Method of Smart Grid via Distributed Generations," in 2016 International Energy and Sustainability Conference, Cologne, Germany, 2016. Jun. 30, 2016

Khoa Le Dinh, Yasuhiro Hayashi, "Experiment with an OFP Controller Based on HPSO-TVAC for a PV-Supplied Microgrid with BESS," in 2014 IEEE PES General Meeting | Conference & Exposition, National Harbor, MD, USA, 2014. Jul. 27-31, 2014.

Andrei Stativa, Mihai Gavrilas, Ovidiu Ivanov, "Optimal Power System Stabilizer Design Using Multiple Wide-Area Input Signals," in 2014 14th International Conference on Environment and Electrical Engineering, Krakow, Poland, 2014. May 10-12, 2014.

T.K. Das, S.R. Jetti, G.K. Venayagamoorthy, "Optimal Design of SVC Damping Controllers with Wide Area Measurements Using Small Population Based PSO," in International Joint Conference on Neural Networks, Vancouver, BC, Canada, Jul. 16-21, 2006.

Brett A. Robbins, Christoforos N. Hadjicostis, Alehandro D. Dominguez-Garcia, "A Two-Stage Distributed Architecture for Voltage Control in Power Distribution Systems," IEEE Transactions on Power Systems, vol. 28, issue 2, pp. 1470-1482, Sep. 24, 2012.

C. Ronald Kube and Eric Bonabeau, "Cooperative Transport by Ants and Robots," Robotics and Autonomous Systems, vol. 30, issues 1-2, pp. 85-101, Jan. 1, 2000.

Muddassaar Farooq and Gianni A. Di Caro, "Routing Protocols for Next-Generation Networks Inspired by Collective Behaviors of Insect Societies: An Overview," in Swarm Intelligence Introduction and Applications, 1st ed. Berlin, Germany; Springer-Verlag, 2008, ch. 4, pp. 101-160. Jan. 1, 2000.

European Extended Search Report, EP Appln. No. 20157168.4, 10 pgs., dated Oct. 2, 2020.

\* cited by examiner

SYSTEM AND METHOD FOR COORDINATING RESOURCES

FIELD OF THE INVENTION

The present disclosure relates to a network of resources to perform a task, and in particular to coordination among a plurality of resources to perform the task.

BACKGROUND

Resource coordination has typically been undertaken by a central coordinator that receives information about a demand for multiple resources that are part of a network, determines the availability of the multiple resources to respond to the demands, and provides instructions for deploying those resources to respond to the demand. For example, an online solution may collect the local measurements at a central dispatch location, which then feeds the local measurement data into a model to determine proper capacity reservations for each resource in order to meet the local service targets. A transmission market might be an example of such a centralized dispatch solution. However, the coordination and deployment of resources to address the demand may require significant computation and communication resources, and may not provide a solution in a timely manner. Therefore there remains a substantial need for the unique architectures, apparatuses, methods, systems and techniques disclosed herein.

SUMMARY

Exemplary embodiments of the disclosure include unique systems, methods, techniques and apparatuses for coordinating resources connected by a communication system to respond to request to perform a task or meet a target service level. Further embodiments, forms, objects, features, advantages, aspects and benefits of the disclosure shall become apparent from the following description and drawings.

DETAILED DESCRIPTION

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
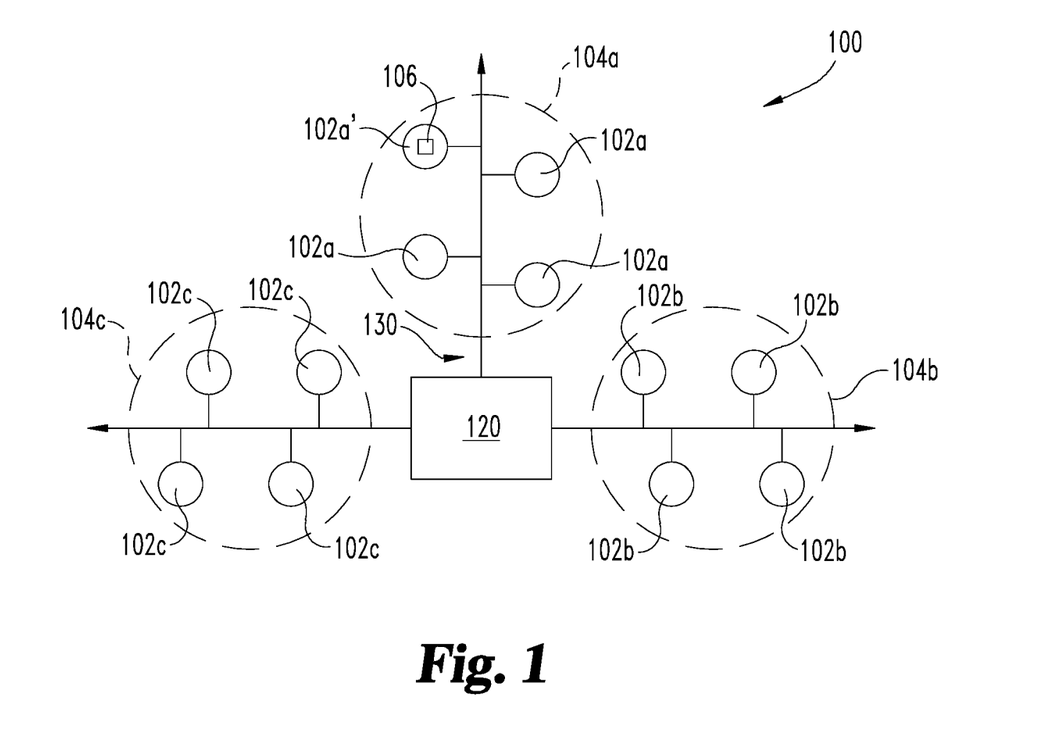
FIG. 1 is a schematic of a resource coordination system.

The present disclosure relates to architectures, apparatuses, methods, systems and techniques for a plurality of resources to coordinate among one another to meet a service level target, such as performing or completing a common task, or providing or meeting a target or criteria for a local service. A system 100 is shown in FIG. 1 which includes a plurality of resources 102a, 102b, 102c grouped in respective clusters 104a, 104b, 104c. Resources 102a, 102b, 102c may also be referred to collectively and individually herein as a resource 102, and clusters 104a, 104b, 104c may be collectively and individually referred to herein as cluster 104. Each resource 102 includes a local controller 106 (only one shown in FIG. 1) for measuring a local service level and for sending and receiving signals, which may include one or more messages. A network resource controller 120 can also be provided that is in communication with the resources 102 of each of the clusters 104a, 104b, 104c. It should be understood that any number of resources 102 and any number of clusters 104 of resources are contemplated. In addition, different numbers and types of resources 102 can be provided within each cluster 104. Also, the grouping of resources 102 in a cluster 104 can be based on any one or combination of a number of factors, including distance between resources 102, types of resources 102, capability of resources 102, capacity of resources 102, and operational status or condition of resources 102, to name a few.

In one embodiment, a first resource 102a' receives a request to perform a task or provide a local service, and attempts to complete the task or provide the local service on its own by achieving a service level target. If the efforts of resource 102a' are insufficient to meet service level target, the first resource 102a' provides a first signal for short range recruitment (SRR) of resources 102a from a local cluster 104a to help meet the service level target. The first signal can be sent on a common communication network of the cluster 104a of resources 102a. If the local cluster 104a of resources 102a is inadequate to meet the service level target, the first resource 102a' or any other local resource 102a in the cluster 104a can provide a second signal to a central repository, such as a network resource controller 120, for long range recruitment (LRR) of resources 102b, 102c from one or more of the other clusters 104a, 104b. This double escalation in resource recruitment reduces the cost of coordination in terms of communication, sensor, and computational resources. In addition, a robust solution for peer-to-peer communication among distributed resources is provided which can be routed around outages and system reconfigurations.

The present disclosure includes self-coordination among the resources 102 to meet the coordination of resources to meet a service level target. A variety of resources 102 may be connected on a network 130 and act together to provide a global service. Network 130 can be wired, wireless, a combination of wired or wireless, and use any suitable communication protocol to coordinate among resources 102 and, if necessary, network resource controller 120. In certain situations, no individual resource 102 has the capacity to meet the service level target on its own, so the resources 102 are coordinated to meet the service level target. In one embodiment, there is a measurement local to each resource 102 that can be used to evaluate whether the task can be performed or the local service is or can be provided by the associated local resource 102.

The local measurements can also be compared with global service requirements to evaluate whether global service tasks and service level targets are being met. In one embodiment, a droop control can be used to ensure that the resources 102 coordinate with each other via their response to the local measurement. Another embodiment employs a distributed method where resources 102 exchange information to determine how to coordinate themselves.

Figure 2:
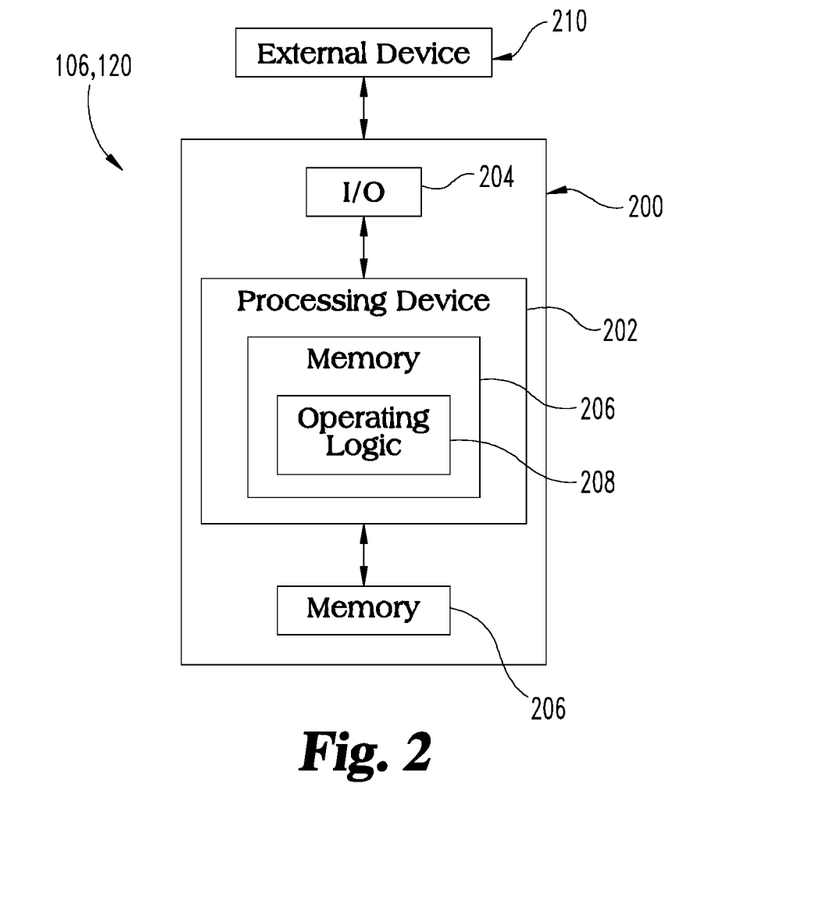
FIG. 2 is a schematic of one embodiment of a controller for a resource or network resource coordinator.

In FIG. 2 there is a schematic block diagram of an exemplary controller 200 such as may be provided as a feedback controller 106 with each of the resources 102 and/or network resource controller 120 of system 100 in FIG. 1. Controller 200 may include a processing device 202, an input/output device 204, memory device 206, and operating logic 208. Furthermore, the controller 200 communicates with one or more other controllers 200 of an external device 210 such as resources 102 and/or network resource controller 120. Controller 200 may be a stand-alone device, an embedded system, or a plurality of devices structured to perform the functions described with respect to system 100.

Input/output device 204 enables controller 200 to communicate with other local controllers or a central controller. Input/output device 204 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 204 may include more than one of these adapters, credentials, or ports, such as a first port for receiving data and a second port for transmitting data.

Processing device 202 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 202 may be dedicated to performance of only the operations described herein or may be used in one or more additional applications. Processing device 202 may be of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 may comprise one or more components of any type suitable to process the signals received from input/output device 204 or elsewhere, and provide desired output signals. Such components may include digital circuitry, analog circuitry, or a combination of both.

Memory device 206, also known as a computer readable medium, may be of one or more types of memory, such as a solid-state variety, electromagnetic variety, optical variety, or a combination of these forms, to name but a few examples. Furthermore, memory device 206 may be volatile, nonvolatile, transitory, non-transitory or a combination of these types, and some or all of memory device 206 may be of a portable variety, such as a disk, tape, memory stick, or cartridge, to name but a few examples. In addition, memory device 206 may store data that is manipulated by operating logic 208 of processing device 202, such as data representative of signals received from and/or sent to input/output device 204 in addition to or in lieu of storing programming instructions defining operating logic 208, just to name one example. Memory device 206 may be included with processing device 202 and/or coupled to processing device 202.

Figure 3:
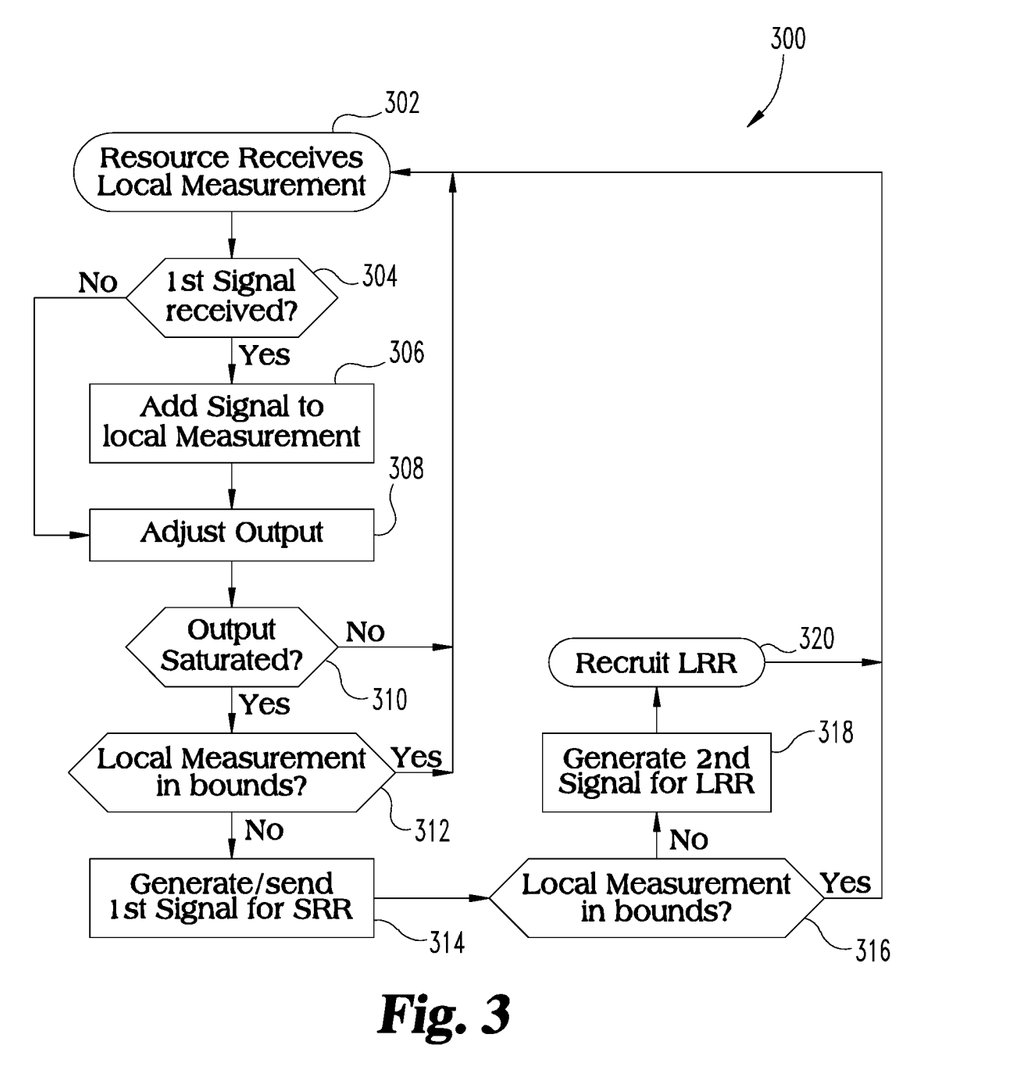
FIG. 3 is a flow diagram of a procedure for coordination of resources.

A procedure 300 is shown in FIG. 3 for coordination of resources within a network to meet a service level target by completing or performing a task, or by providing or meeting a target or criteria for a local service. Procedure 300 includes an operation 302 in which the local measurement is input to the controller 106 of the associated resource 102a'. The measurement can be provided by the associated resource 102a', received from another resource 102a in the cluster 104a, or from the network resource controller 120. At conditional 304, it is determined if a first signal has been received that requests input from one or more resources 102a of the associated cluster 104a to meet the service level target. If conditional 304 is YES, procedure 300 continues at operation 306 to add the local resource contribution associated with the first signal to the local measurement. From operation 306, or if conditional 304 is NO, procedure 300 continues at operation 308 to adjust the output of the associated resource 102a' in response to this local measurement and any resource contribution from resources 102a in cluster 104a.

From operation 308, procedure 300 continues at conditional 310 to determine if the output of the first resource 102a' is saturated or has reached its maximum capacity. If conditional 310 is NO, procedure 300 returns to operation 302. If conditional 310 is YES, procedure 300 continues at conditional 312 to determine if the local measurement is in bounds or otherwise indicates the service level target can be satisfied by the first resource 102a'. If conditional 312 is YES, procedure 300 returns to operation 302. If conditional 312 is NO, procedure 300 continues at operation 314 to generate and send a first signal for short range recruitment of resources 102a in the associated cluster 104a of the first resource 102a'. This first signal can provide some indication of how much effort is needed to meet the service level target at the first resource 102a'. This first signal can also be fed into the local controller 106 of the resources 102a so that they adjust their output to support the first resource 102a' in achieving the service level target.

After passage of a first period of time, procedure 300 continues at conditional 316 to determine if the local measurement is in bounds and if the resources 102a can meet the service level target. If conditional 316 is YES, procedure 300 continues at operation 302. If conditional 316 is NO, procedure 300 continues at operation 3180 to generate a second signal for long range recruitment of resources 102 from other clusters 104 by generating and sending a second signal to network resource controller 120, which may be a centralized location.

At operation 320 the network resource controller 120 can forward the second signal and any associated message to long range resources 102b, 102c that have capacity and are in long range communication and further away on the network 30 than the local cluster 104a of resources 102a. This communication arrangement may prioritize resources designed to affect a larger area of the system 100. These long range resources 102b, 102c can adjust their output to improve global service in a way that will also support the local service target provided at the original resource 102a'.

Each resource 102 has a local controller 106 that monitors the local measurement and attempts to meet a service level target. If the initial resource 102a' reaches its capacity and the service level target still is not met, it will release a first signal over a local communication network that will be received by neighboring resources 102a in a local cluster 104a. The local resources 102a will process the first signal in their respective controllers 106 so that they adjust their outputs in such a way as to support the original resource 102a' in achieving the service level target. If, after some time, the original resource 102a' still has not met its service level target with the contributions from the other resources 102a, then the original resource 102a', or any of the other resources 102a, will send a message to network resource controller 120 for additional resource recruitment.

Network resource controller 120 may be a larger upstream resource with a large capacity capable of impacting the entire area of the network where the original resource 102a' resides, or may be a central dispatching station, or other suitable network resource control apparatus. The second signal is forwarded from the network resource controller 120 to any other resource 102 belonging to the same network. Any such resource 102 that has spare capacity adjusts its capacity in such a way as to change the behavior of the overall network so that it supports the original resource 102a' in achieving the local service level target.

The present disclosure applies to any system where a large number of resources are connected in a network to work together to meet a global service. Various examples are provided below, including resources such as inverters, capacitor banks, and tap changers attempting to regulate the voltage on a power distribution network; objects in the Internet of Things coordinating their operation to avoid a power peak; a set of routers sending data through a communication network; and a group of robots attempting to lift an object. The present disclosure is not limited to the specification examples disclosed herein, and may be applied with any other similar assortment of resources where the individual capacity of one resource is insufficient to meet a service level target for the resource within network.

Example 1

One example of system 100 includes the coordination of resources 102 that are distributed energy resources, such as inverters, capacitors, and tap changers, in order to regulate voltage on a power distribution network. The electrical network serves as the network 130 over which the resources 102 are coupled. The service level target provided by the resources 102 includes maintaining the voltage throughout the distribution network within an acceptable range, such as 1.05 to 0.95 pu. The local measurement at each resource 102 is the voltage at the resource's terminals. The network resource controller 120 may be a larger upstream resource such as a tap changer or FACTS device, or may be a centralized dispatch controller such as a SCADA station. The output of each resource 102 includes reactive power production and/or consumption.

Figure 4A:
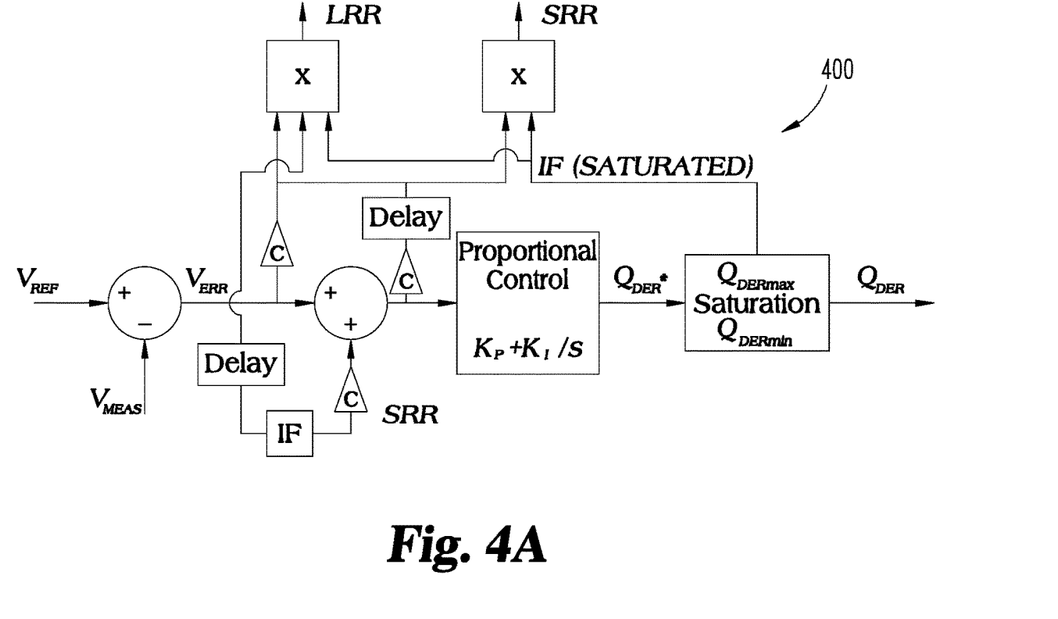
FIGS. 4A-C are schematics of one embodiment of a local control diagram configured for short range and long range resource recruitment in a power distribution system.
Figure 4B:
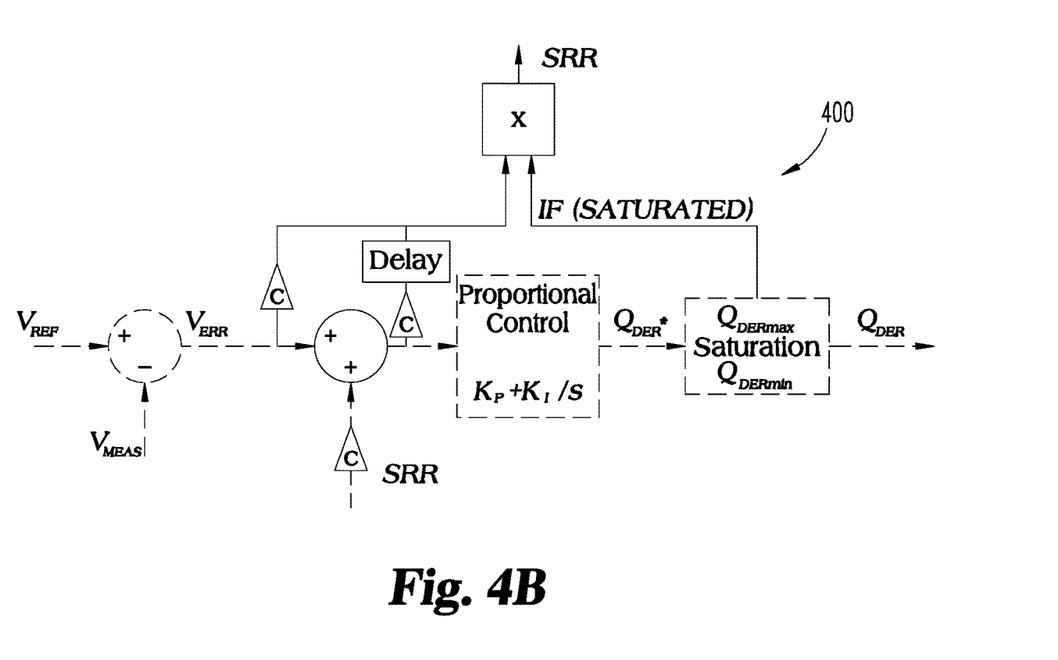
Figure 4C:
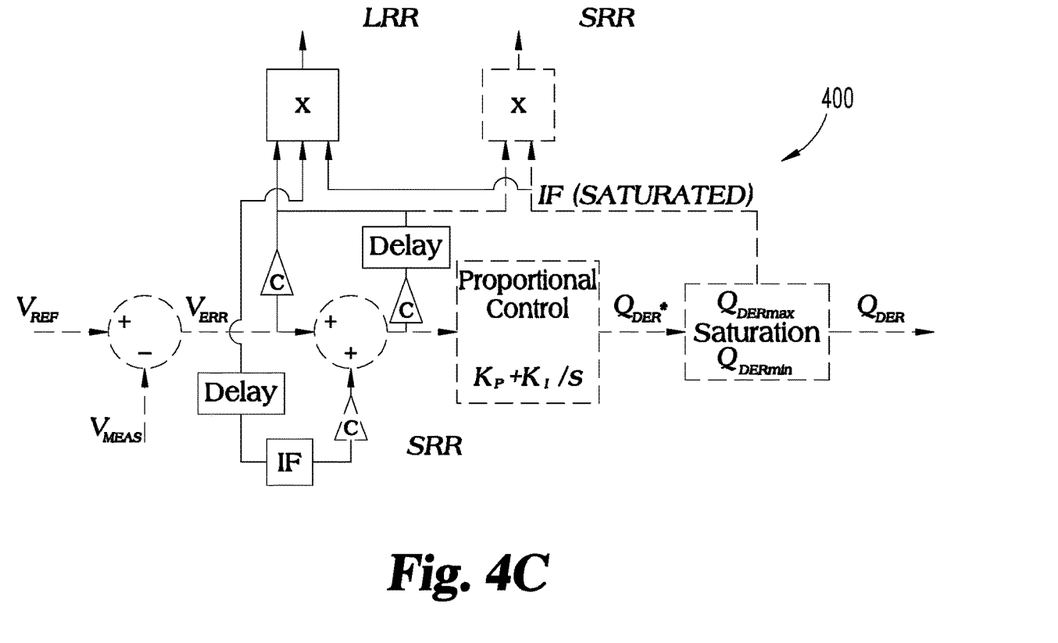

A proposed local controller 106 for regulating voltage on a power distribution network is illustrated in FIGS. 4A-4C, designated as controller 400. Controller 400 is a local PI controller that may be implemented with a droop control, PI control, or lead/lag control. The local measurement is input as a voltage error. Each resource 102 monitors the local voltage $V_{MEAS}$ and compares it to the reference $V_{REF}$, producing an error signal $V_{ERR}$. If the resource 102 is being recruited to help an original resource 102a', the first signal from the original resource 102a' is added to the input. If more than one resource 102 is requesting assistance, then their signals are summed.

The error signal is input to the proportional control block and produces a reactive power command, $Q_{DER}^*$. This command is input into a saturation block. As long as this commanded reactive power is within the range of reactive power available to the original resource 102a', no further action is taken. If, however, the reactive power command exceeds the reactive power available to the resource 102a', the saturation block triggers the production of an SRR signal. A "1" is sent to the multiplier block (in normal operation a 0 is sent to that block) and is multiplied by the generated signal to initiate local, short range recruitment.

There are several options for generating the first signal magnitude for short range recruitment. FIG. 4B highlights in solid lines the circuitry from FIG. 4A responsible for generating this signal in controller 400. In a first embodiment, the raw value of the signal is extracted from the locally measured voltage error. Alternatively, the raw value may be taken after any received signal is added to the voltage error. The first embodiment ensures that the signal is only sent to neighbor resources 102a and triggers long range recruitment in a controlled fashion. The second embodiment causes the initial signal to be propagated forward automatically to neighbors of neighbors of the resources 102a, eventually reaching the network resource controller 120, such as the transformer tap changer. In this embodiment, a delay block can be used to give the local resources 102a enough time to attempt to correct the error. In addition, in this embodiment there is no need for long range recruitment as the first signal is automatically propagated to distance resources.

In another embodiment, the SRR signal is generated by placing and selecting the scaling factor C. This scaling factor has a value between 0 and 1 and helps to stabilize the system. The scaling factor may be applied before the SRR signal is transmitted or after it is received. The advantage of the latter approach is that the SRR signal may be scaled depending on which resource 102 is receiving it. In this way nearby resources can be prioritized, while more distant resources 102b, 102c only respond weakly to the stimulus.

Another variable for SRR is determining in this example and in any other application is which resources 102 should be considered short range. For example, if a Wi-Fi network or cellular tower is used for communications, all resources 102 within range of a single Wi-Fi hub or cell tower might be enrolled in a common cluster 104 as valid short range resource candidates to each other. This results in a geographic clustering. Resources 102 on a single feeder or zone may also be clustered together, with a local communication network serving to transmit the SRR signals. This could be a power line communication (PLC) network, a local wireless network, a local wired network via the SCADA system, or a software clustering within a larger communication network such as the Internet. Finally, resources 102 may be clustered according to their ability to influence each other's voltage. A long range communication network may be required to connect these clustered resources, so they may be clustered in software rather than by physical hardware.

The generation of the second signal for long range recruitment is shown in FIG. 4C. If the controller 400 is saturated and the resource 102a is receiving an SRR signal, a LRR signal is sent to other resources 102b, 102c. As with SRR signal generation, this LRR signal may be tapped from the error voltage or from the sum of the error voltage and received first signals (though the latter produces two long range recruitment mechanisms). The simultaneous presence of local controller saturation and received SRR signal indicates that a local cluster 104a of resources 102a has not been able to redress the local service target voltage. A delay is added to give the local cluster 104a adequate time to bring the voltage within acceptable limits to satisfy the local service target.

The LRR signal may be received and acted upon in any one of several ways. First, the LRR signal may be sent to a wider cluster of resources 102. This may be those resources in a larger geographic region, a larger distribution zone further upstream of the original resource, or a set of resources 102 with a weaker influence on the original node's voltage. This could be sent through a cell tower with an address outside the tower's reach, through PLC repeaters, or by selecting a wider distribution in the software of a large scale communication network such as the Internet.

Alternatively, the LRR signal may be exclusively sent to large scale voltage type network resource controllers 120 such as capacitor banks, transformer tap changers, SVCs, and STATCOMs. These large resources are likely to be able to resolve any voltage violation downstream from their installation, so they can be seen as the last point of appeal if the local cluster 104a cannot satisfy the local service target. The delay function on the LRR signal ensures that these larger resources only act after the local resources 102a and are not switched on and off quickly. If, by their action, another voltage violation occurs, the local clusters 104a can adjust their outputs to deal with the violation before attempting to undo the change.

In another arrangement, the LRR signal may be queued at a common network resource controller 120 location such as a SCADA controller which may be polled by resources that have spare capacity at regular intervals. In this way extra burdens are distributed among those resources 102 most able to handle them, and the distributed resources are used before large scale controllers such as the tap changers are deployed. A variation in this arrangement may have two queues based on two different delays. The first queue is for distributed resources that have extra capacity, while the second, with the longer delay, directs requests for assistance to the larger scale voltage controllers.

One embodiment of a procedure for coordinating distributed energy resources to control voltage on a power distribution network includes using a droop, PI, or other local controller at the original or first resource 102a' which has a voltage error as an input to generate a SRR signal to ask for assistance in meeting the service level target when the controller is saturated and the error is not zero. The SRR signal is proportional to the remaining voltage error at the first resource 102a' plus any SRR signals received from other resources, including a delay to enable local resources time to correct for local voltage errors.

In the case where the SRR signal is proportional to the remaining voltage error alone, a LRR signal to a network resource controller 120 can be generated when the first resource 102a' is receiving a SRR signal and when its own controller 400 is saturated, indicating that local resources 102a are insufficient to satisfy the service level target, so that larger upstream resources are dispatched. The network resource controller 120 includes a larger set of resources than were included in the original short range recruitment. The network resource controller 120 can control one or more large scale voltage regulation devices such as a capacitor bank, transformer tap changer, or STATCOM, capable of influencing the voltage across a large portion of the power distribution network including the area of the original resource 102a'. The network resource controller 120 can include a common dispatch controller such as a SCADA system which identifies other resources with spare reactive power capacity and directs them to correct the voltage violation at the original resource 102a'. The common dispatch controller can prioritize the use of distributed energy resources over large scale voltage regulation devices such as capacitor banks, transformer tap changers, or STATCOMs.

Example 2

In another example the system 100 includes the Internet of Things for peak power management. The electric lines and internet can serve as the network on which the resources 102 are connected. The local service target can be limiting the power consumption of the system or an object in the system below a target. The resources 102 are power consuming devices that are connected to the Internet of Things. The local measurement of each resource 102 includes its power consumption and a set of measurements indicating the power needed for the resource 102 to provide its local service. For example, a refrigerator on the Internet of Things might have a temperature sensor indicating whether it needs to consume power to cool the objects in the refrigerator. The network resource controller 120 of the system is a power manager and the output of each resource is its power consumption.

The network resource controller 120 includes a measurement of the total power consumption of the connected resources 102. In certain circumstances the network resource controller 120 may operate to limit the total power consumption, such as to avoid a peak consumption charge or in response to a demand response event. The necessary power reduction is the service level target that can be divided among all resources 102 and each resource 102 is sent a service level target from the network resource controller 120. The resource 102 will attempt to reduce its consumption below its power target to meet the service level target. If the resource 102 is unable to meet its service level target because its local measurements indicate that more power is needed in order to provide its local service, the resource is saturated. The saturated resource releases a SRR signal to nearby resources to request them to meet the shortfall by reducing their own consumption. This SRR signal is proportional to the amount by which the initial resource 102a' falls short of meeting its service level target. If a resource 102 receives an SRR signal indicating a shortfall but is itself saturated, it forwards a LRR signal to the power manager acting as the network resource controller 120, which will then forward the LRR signal to more distant resources.

Example 3

In another example, the system 100 is for communication network traffic management in which communication nodes are resources 102 coupled to the network. The network can be divided into clusters 104 of neighboring nodes and into a larger super cluster of nodes. In an embodiment, neighbors include all nodes that can be reached from the current node in a single message hop. The local service target provided by the nodes is the transmission of messages from a source node (original resource 102a') in the network to a receiving node elsewhere in the network using the most efficient route. The local measurement is a routing table for each node that estimates the time it takes to get from that node to a destination node. The network resource controller 120 is the root node for the super cluster to which the current node belongs. The output of the local controller for each resource is selecting the next node to which to send a message.

The movement speed of a message through this network depends on the waiting time due to queues formed at a single node and the number of hops it takes to get between nodes. If there is no queue, then the message arrives fastest by taking the most direct path. If there is a queue, however, then the message may be faster by bypassing a congested node even if it takes more hops. The estimate of the queue size at the node is included in the SRR signal in this example.

In this example, the network is mapped and counts the number of hops between nodes. This can be used to estimate time due to traveling from one node to another. The queue time is indicated by a SRR signal from each node. This SRR signal is generated when the queue time at the node exceeds a defined limit indicating the saturation of that node.

The SRR signal is sent from each saturated node to each neighboring node. SRR signals are then further propagated to further nodes in the system. This SRR signal identifies the node from which it originates and the queue time at that node. When a node receives a SRR signal, it checks if the node associated with that signal is on its routing tables. It then updates each such route entry with the queue time for that node. The probability of using that route will be adjusted based on the new time for the route including this updated queue time at the saturated node.

If the original node remains highly congested for an extended period of time after sending out the SRR signal to neighbor nodes, it generates a LRR signal with a message to be sent to the network resource controller 120 indicating that this entire cluster of nodes may be congested. The network resource controller 120 can then forward this LRR signal to all nodes within the cluster so that they adjust their route time estimates and hence the probability of using routes with saturated nodes. It will also adjust its local route tables for messages received from other super clusters.

In the proposed example, the SRR signals are only needed to find the network structure (i.e. number of hops between nodes). This can be done much less frequently than normal since the structure will only change due to outages or repositioning of mobile network nodes. The LRR signals are propagated with the same frequency as the explorer signals in order to maintain accurate estimates of queue times, and are issued when a node saturates.

Example 4

In another example, resources 102 include robots attempting to move an object. The robots may be coupled by a network 130 that is an RF communication network. The robots may be tasked with storing objects in and retrieving objects from a central location, such as a warehouse. The task or local service target the robots are to provide includes the movement of objects into, within, and out of the warehouse. The local measurement used by the robots to move the objects can include video camera inputs, enabling the robots to both identify objects and determine if a particular storage location is full or empty. The network resource controller 120 in this example can be a central dispatch computer or controller which is in communication with all robots in the network. The output of the robots is picking up and moving an object.

In normal operation, the robot moves through the warehouse looking for objects that need to be moved. When such an object is located via the visual local measurement signal, the robot that is the first or original resource 102a' attempts to move the object itself. If the original robot is unable to move the object itself, it releases a SRR signal on the RF network to recruit nearby robots to come help move the object.

In a further example, a large number of pallets of a product may need to be moved. The original robot can only move one pallet at a time, so the original robot summons nearby robots via a SRR signal over the RF network to collect the other pallets. Alternatively, the robot may not have the strength to lift a large object, so it summons nearby robots via a SRR signal over the RF network to work together to move the object. The recruited robots will attempt to move the object or collection of pallets. After the elapse of a period of time, if the robots have not moved the large object, or are not able to clear the pallets in a timely manner, one or more of the robots may send a LRR signal over the RF network to the network resource controller 120, such as the central robot dispatching computer. This network resource controller 120 may then dispatch robots from elsewhere in the network that are not currently committed to a task in order to support the work being done by the original robot.

Various aspects of the present disclosure are contemplated. According to one aspect, a method for meeting a local service target includes receiving a local measurement regarding the local service target at a first resource; determining, at the first resource, an available output of the first resource cannot meet the local service target; in response to determining the first resource cannot meet the local service target, providing, from the first resource, a first signal to a cluster of resources associated with the first resource requesting an output allocation from the cluster of resources toward meeting the local service target; determining whether the output allocation from the cluster of resources can meet the local service target; and in response to the output allocation from the cluster of resources not being able to meet the local service target, providing a second signal from one or more of the first resource and the cluster of resources to a network resource controller associated with the cluster of resources. The network resource controller provides a signal to recruit one or more additional resources to provide additional output allocations to meet the local service target.

In an embodiment, determining the available output of the first resource cannot meet the local service target includes determining that the available output of the first resource is saturated. In another embodiment, determining the available output of the first resource cannot meet the local service target includes determining the available output of the first resource is insufficient to meet the local service target. In another embodiment, determining the output allocation of the cluster of resources cannot meet the local service target includes determining that the output allocation of the cluster of resources is saturated.

In an embodiment, determining the output allocation of the cluster of resources cannot meet the local service target includes determining the output allocation of the cluster of resources is insufficient to meet the local service target. In another embodiment, the first resource and each resource in the cluster of resources includes a feedback controller that receives the local measurement and is operable to control an output thereof in response to the local measurement. In yet another embodiment, the first and second signals include an indication of an additional output amount to meet the local service target.

In an embodiment, the resources are robots connected to one another by a radio frequency communication network. The local service target may include moving one or more objects with the robots.

In an embodiment, the resources are nodes coupled to one another in a communication network and the local service target includes a speed of transmission of a message from a source node to a receiving node. The output allocation may be a queue time at each of the nodes.

In an embodiment, the resources are power consuming devices connected to one another in an electrical network. The local service target may be a power consumption limit for the power consuming devices. In another embodiment, the resources are distributed energy resources in a power distribution network and the local service target is an acceptable voltage range at each of the distributed energy resources.

According to another aspect, a method for meeting a local service target includes receiving a local measurement regarding the local service target at a first resource; determining, at the first resource, an available output of the first resource cannot meet the local service target, where determining the available output of the first resource cannot meet the local service target includes determining at least one of an output of the first resource is saturated and the available output of the first resource is insufficient to meet the local service target; in response to determining the available output of the first resource cannot meet the local service target, providing, from the first resource, a first signal to a cluster of resources associated with the first resource requesting an output allocation from the cluster of resources toward meeting the local service target; and providing a second signal to one or more additional clusters of resources for additional output to meet the local service target in response to the cluster of resources not being able to meet the local service target.

In an embodiment, the method includes determining the output allocation from the cluster of resources cannot meet the local service target in response to at least one of the available output of the cluster of resources being saturated and the available output of the cluster of resources being insufficient to meet the local service target. The second signal can be provided from a network resource controller associated with the cluster of resources and the additional clusters of resources.

In another aspect, a system for managing local service targets includes a network resource controller and a number of clusters of resources in communication with the network resource controller. Each of the clusters of resources includes a plurality of resources in communication with one another within the respective cluster of resources. Each of the plurality of resources includes a local controller for managing an output of the corresponding resource in meeting a local service target. Each of the local controllers is configured to receive a local measurement regarding the local service target for the corresponding resource in a first cluster of resources; output a first signal to one or more resources in the first cluster of resources to request an output allocation from the first cluster of resources toward meeting the local service target in response to an available output for the corresponding resource not being sufficient to meet the local service target; and output a second signal to the network resource administrator controller in response to the output allocation from the first cluster of resources not being able to meet the local service target.

In an embodiment, the network resource administrator controller is configured to output a third signal to one or more distant resources to provide additional output allocations to meet the local service target. The one or more distant resources may not be part of the first cluster of resources.

In an embodiment, the local controller is configured to determine the available output of the corresponding resource cannot meet the local service target in response to one or more of the output of the corresponding resource being saturated and the available output of the corresponding resource being insufficient to meet the local service target.

In an embodiment, the local controller is configured to determine the output allocation of the first cluster of resources cannot meet the local service target in response to one or more of an output of the first cluster of resources being saturated and the available output of the first cluster of resources being insufficient to meet the local service target. In another embodiment, the first and second signals include an indication of an additional output requested to meet the local service target.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

I claim:

1. A method for meeting a local service target, comprising:
  receiving a local measurement regarding the local service target at a first resource;
  determining, at the first resource, an available output of the first resource cannot meet the local service target;
  in response to determining the first resource cannot meet the local service target, providing, from the first resource, a first signal to a cluster of resources associated with the first resource requesting an output allocation from the cluster of resources toward meeting the local service target;
  determining whether the output allocation from the cluster of resources can meet the local service target; and
  in response to the output allocation from the cluster of resources not being able to meet the local service target, providing a second signal from one or more of the first resource and the cluster of resources to a network resource controller associated with the cluster of resources, wherein the network resource controller provides a signal to recruit one or more additional resources to provide additional output allocations to meet the local service target.

2. The method of claim 1, wherein determining the available output of the first resource cannot meet the local service target includes determining that the available output of the first resource is saturated.

3. The method of claim 1, wherein determining the available output of the first resource cannot meet the local service target includes determining the available output of the first resource is insufficient to meet the local service target.

4. The method of claim 1, wherein determining the output allocation of the cluster of resources cannot meet the local service target includes determining that the output allocation of the cluster of resources is saturated.

5. The method of claim 1, wherein determining the output allocation of the cluster of resources cannot meet the local service target includes determining the output allocation of the cluster of resources is insufficient to meet the local service target.

6. The method of claim 1, wherein the first resource and each resource in the cluster of resources includes a feedback controller that receives the local measurement and is operable to control an output thereof in response to the local measurement.

7. The method of claim 1, where the first and second signals include an indication of an additional output amount to meet the local service target.

8. The method of claim 1, wherein the resources are robots connected to one another by a radio frequency communication network.

9. The method of claim 8, wherein the local service target includes moving one or more objects with the robots.

10. The method of claim 1, wherein the resources are nodes coupled to one another in a communication network and the local service target includes a speed of transmission of a message from a source node to a receiving node.

11. The method of claim 10, wherein the output allocation is a queue time at each of the nodes.

12. The method of claim 1, wherein the resources are power consuming devices connected to one another in an electrical network.

13. The method of claim 12, wherein the local service target is a power consumption limit for the power consuming devices.

14. The method of claim 1, wherein the resources are distributed energy resources in a power distribution network and the local service target is an acceptable voltage range at each of the distributed energy resources.

15. A method for meeting a local service target, comprising:
receiving a local measurement regarding the local service target at a first resource;
determining, at the first resource, an available output of the first resource cannot meet the local service target, wherein determining the available output of the first resource cannot meet the local service target includes determining at least one of an output of the first resource is saturated and the available output of the first resource is insufficient to meet the local service target;
in response to determining the available output of the first resource cannot meet the local service target, providing, from the first resource, a first signal to a cluster of resources associated with the first resource requesting an output allocation from the cluster of resources toward meeting the local service target; and
providing a second signal to one or more additional clusters of resources for additional output to meet the local service target in response to the cluster of resources not being able to meet the local service target.

16. The method of claim 15, further comprising determining the output allocation from the cluster of resources cannot meet the local service target in response to at least one of the available output of the cluster of resources being saturated and the available output of the cluster of resources being insufficient to meet the local service target.

17. The method of claim 16, wherein the second signal is provided from a network resource controller associated with the cluster of resources and the additional clusters of resources.

18. A system for managing local service targets, comprising:
a network resource controller;
a number of clusters of resources in communication with the network resource controller, wherein each of the clusters of resources includes a plurality of resources in communication with one another within the respective cluster of resources; and
each of the plurality of resources includes a local controller for managing an output of the corresponding resource in meeting a local service target, wherein each of the local controllers is configured to:
receive a local measurement regarding the local service target for the corresponding resource in a first cluster of resources;
output a first signal to one or more resources in the first cluster of resources to request an output allocation from the first cluster of resources toward meeting the local service target in response to an available output for the corresponding resource not being sufficient to meet the local service target; and
output a second signal to the network resource administrator controller in response to the output allocation from the first cluster of resources not being able to meet the local service target.

19. The system of claim 18, wherein the network resource administrator controller is configured to output a third signal to one or more distant resources to provide additional output allocations to meet the local service target.

20. The system of claim 19, wherein the one or more distant resources are not part of the first cluster of resources.

21. The system of claim 18, wherein the local controller is configured to determine the available output of the corresponding resource cannot meet the local service target in response to one or more of the output of the corresponding resource being saturated and the available output of the corresponding resource being insufficient to meet the local service target.

22. The system of claim 18, wherein the local controller is configured to determine the output allocation of the first cluster of resources cannot meet the local service target in response to one or more of an output of the first cluster of resources being saturated and the available output of the first cluster of resources being insufficient to meet the local service target.

23. The system of claim 18, where the first and second signals include an indication of an additional output requested to meet the local service target.

* * * * *